Figure 1:
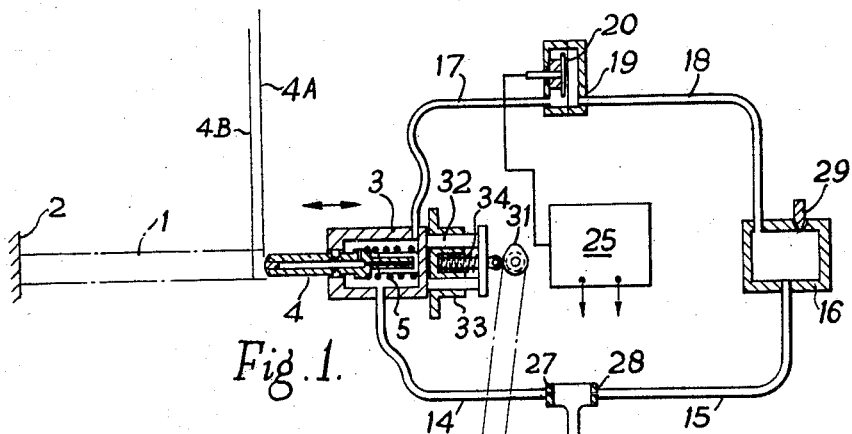

Dec. 31, 1963  G. F. W. POWELL  3,116,478
BALANCED PULSED PNEUMATIC BRIDGE TYPE DETECTOR
OF CIGARETTE PRESENCE AND
PACKING DENSITY
Filed Oct. 6, 1960

INVENTOR
Gordon Francis Wellington Powell
BY
Watson, Cole, Grindle & Watson
ATTORNEYS United States Patent Office 3,116,478
Patented Dec. 31, 1963

3,116,478
BALANCED PULSED PNEUMATIC BRIDGE TYPE DETECTOR OF CIGARETTE PRESENCE AND PACKING DENSITY
Gordon Francis Wellington Powell, Deptford, London, England, assignor to Molins Machine Company Limited, London, England, a British company
Filed Oct. 6, 1960, Ser. No. 60,921
Claims priority, application Great Britain Oct. 7, 1959
1 Claim. (Cl. 340—282)

This invention concerns improvements in workpiece detectors, such as are used on machines for detecting defects in workpieces, or the absence or presence of a workpiece, by a feeling operation.

In automatic cigarette packing machines, for example, a batch of cigarettes is tested by applying a group of feelers, usually plungers, to the ends of the cigarettes and if a cigarette is missing from the batch or an end of a cigarette is unduly soft (that is, the filling is inadequate) the movement of the corresponding plunger will differ from that of the other plungers and a signal is made. Such a signal may be utilised to give an alarm, or to cause rejection of the faulty batch at some convenient point, or both. Hitherto all such devices have operated by directly making or breaking an electric circuit by a feeler when said feeler movement is conditioned by a defect in a batch and such devices are not as reliable as is desirable, for example, in the specific case, a lot of dust accumulates near the detecting device and may prevent effective electrical contact. The device according to the invention, while particularly useful as a cigarette detector, is not limited to such purpose and may be used in any position where detection of a workpiece is necessary.

According to the invention there is provided a workpiece detector having a movable resiliently mounted feeler, and a workpiece support, said feeler and the workpiece support being relatively movable whereby the feeler may be brought into contact with a workpiece if present on the support, and means for causing such relative movement whereby the feeler due to its resilient mounting is finally brought into a position depending on the resistance offered by the workpiece to the feeler, said feeler being movable in a feeler chamber subjected to pulses of pressure air and arranged to permit the escape of air if during a pressure pulse the feeler projects out of the chamber beyond a desired amount, the chamber being subjected to a pulse of pressure air at the time the feeler is in the detecting position a further chamber subjected to the same pulse of pressure air and so arranged and adjusted as to have the same pressure as the feeler chamber when the feeler is so positioned as to prevent escape of air from the feeler chamber, and pipes leading one from each chamber to a device comprising two compartments separated by a diaphragm whereby feeler positions which permit the escape of air from the feeler chamber give rise to diminished pressure on the corresponding side of the diaphragm and means whereby diaphragm movements are utilised to provide a signal which may be used to cause the operation of an alarm or other device.

The diaphragm operated device may comprise a differential capacity transducer wherein the diaphragm constitutes one plate of a condenser and moves towards or away from another plate, thereby causing a change in electric capacity.

Alternatively the diaphragm may operate one contact of a switch and thus cause contact to be made or broken according to the diaphragm movements.

The pulse of pressure air may be provided by an air capsule which is compressed periodically to provide a pulse at the time of detection.

Alternatively a source of continuous pressure air may be used, such air being normally available in many factories, and in such a case a timing switch is provided arranged to mute the detector until the proper moment for detecting. Further with this arrangement the aforesaid diaphragm may be biased so that only on a pressure drop in the feeler chamber would the capacity change. This arrangement permits the said further chamber to be dispensed with.

The apparatus may be arranged to detect more than one workpiece at a time by providing a suitable number of feelers, for example, a batch of cigarettes grouped ready for packing may be tested by a group of feelers arranged as plungers in the said chamber so that the presence of one defective cigarette, or the absence of a cigarette from the batch, will reduce the resistance offered to the corresponding plunger and causes a drop in pressure in the feeler chamber.

The transducer referred to may be connected to a device known as a transistorized capacity-change detector which device is extremely sensitive to capacity changes and embodies a switch whereby any further electrical device may be energised to denote the fault in a workpiece and operate any apparatus for dealing with the fault. Commercial devices of this kind are available.

Figure 2:
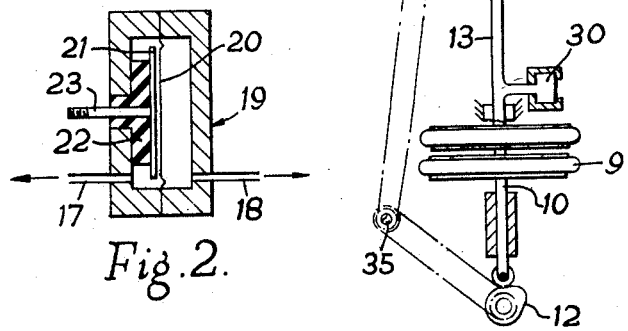
Figure 3:
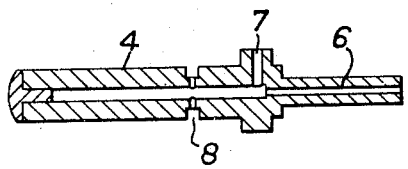
Figure 4:
Figure 5:
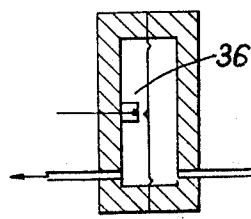

One construction according to the invention will be described with reference to the accompanying drawings, in which:

FIGURE 1 is a diagram of the whole apparatus showing the invention as applied to the detection of cigarettes, FIGURE 2 is a section of a differential capacity transducer, FIGURE 3 is an enlarged section of a plunger or feeler shown in FIGURE 1, and FIGURE 4 is an end view of FIGURE 3, FIGURE 5 is a cross-section of a diaphragm-operated switch.

Referring to the drawings, 1 represents a cigarette having one end tested for its consistency. The other end is shown abutting a surface 2 constituting a workpiece support but where, as is usual, both ends are to be tested the detector device about to be described is duplicated, the duplicate device being located at another position, so that two separate tests are made. The device comprises a hollow body 3 constituting a chamber in which is slidably mounted a plunger or feeler 4. A spring 5 normally holds the plunger projecting a little more than the position shown so that a hole 8, referred to again later, is outside of the body 3 but when, as hereafter related, the body moves to the left the plunger will press on the end of the cigarette and stop moving when the resistance offered by the cigarette is sufficient to compress the spring. That is the condition as illustrated.

The plunger has an internal bore 6, see FIGURE 3, with ports 7 and 8. When, as is usual, a batch of cigarettes is to be tested at once there are a number of plungers or feelers like 4 mounted in the body, as described, one for each cigarette.

The body is moved to and fro as indicated by the double-headed arrow once per detecting operation or in the case of the ordinary cigarette packing machine, once per cycle, a cycle being the time interval between the delivery of two successive packets of cigarettes. Movement for the feeling operation may be effected by a cam 31 which engages a frame 32 fixed to the body 3 and slidable in guides 33. The return movement is by a spring 34.

9 is an air capsule of known kind having a pressure stem 10 with a roller 11 at its lower end which is pressed by a cam 12 once per detecting operation, or cycle. Pressure on the stem will cause a pressure pulse inside the air system shown and pressure in pipe 13 will pass by pipe 14 to the interior of the body 3. At the same time the pressure in pipe 13 will be transmitted by pipe 15 to a chamber 16. From the body 3 and chamber 16 the pressure will be transmitted by pipes 17 and 18 respectively to a differential capacity transducer 19.

If the consistency of the end of the cigarette is satisfactory (that is, it is not too soft) the plunger 4 will stay substantially in the position shown on the line 4A although the body will move on, and compress the spring 5 still more as the body moves more to the left. Under these circumstances the pressure in body 3 and chamber 16 is the same and also in pipes 17 and 18 so there will be no difference in pressure between the air spaces on either side of a diaphragm 20 of the transducer 19. This, see FIGURE 2, comprises an electrode 21 mounted on an insulating block 22 and having a terminal rod 23. If there is any diaphragm movement due to pressure difference in the spaces inside the transducer there will be a difference in electrical capacity in the capacitor formed by 20 and 21 and the intervening air. A lead 24 connects the rod 23 to a device shown as a block 25. This is a transistorized capacity change detector, embodying a switch, the whole device being a commercial article capable of operating in response to very minute capacity changes. Two leads 26 are shown as coming from the block 25 and these can lead to apparatus giving a visual or aural signal and also, if desired, to devices for ejecting a batch containing a defective cigarette from a machine.

In order to isolate the chamber 16, from the body 3 as far as possible the pipe 13 leads into pipes 14 and 15 through small orifices or restrictions 27 and 28. The chamber in body 3 in the arrangement shown has a leak to atmosphere through a slight clearance between the plunger and the body, or it may have an adjustable leak as next described with reference to the chamber 16. The chamber 16 is provided with an adjustable orifice at 29 for the same purpose. The apparatus is adjusted so that with the plunger 4 in the position shown a pulse from the capsule 9 will cause equal pressures in the chamber of body 3 and the chamber 16 so that the diaphragm of the transducer will remain in its position of rest. If the body 3 is moved for a detecting operation and the plunger 4 encounters a satisfactory cigarette, that is as shown in FIGURE 1, the pressures in body and chamber will be equal and there will be no diaphragm movement. If however the cigarette under test has a soft end or there is not a cigarette in position for detection the plunger will move forwards without opposition, say to the position 4B, and the air inside body 3 will escape, as the pressure pulse comes on, through ports 7 and 8 via bore 6.

Under these circumstances the pressure in chamber 16 is higher than in the body 3 so the diaphragm 20 will be pressed towards the electrode 21 and the capacity will rise and the device 25 will operate.

The cams 12 and 31 move in synchronism as they are driven from a common source 35.

The restrictions 27 and 28 allow the pressure in the body 3 to drop without this drop being directly communicated to the chamber 16.

In a cycle of operations, with the construction illustrated, the events are as follows:

(1) The body 3 moves forwards with the plunger 4 in its extreme forward position and thus the chamber in 3 is open to atmosphere through port 8.

(2) The plunger encounters a cigarette and is pressed into the body to an extent depending on the density of the end of the cigarette. Of course if the cigarette is missing the plunger will not be pressed in at all. If the cigarette is satisfactory the plunger will stop at about the position 4A and the chamber in 3 is shut off from amosphere.

(3) At, or slightly after, the time the plunger should be as shown in FIGURE 1 the cam 12 depresses capsule 9 causing a flow of positive pressure air through the restrictions 27 and 28. The pressure in chamber 16 and in body 3 rises (at the same rate in this specific case) so the pressures on either side of diaphragm 20 are unchanged, and no signal is given.

(4) If however, a defective cigarette is at the test position the port 8 will remain open to atmosphere and the pressure in chamber 16 will be higher than in the body 3 and the diaphragm 20 will shift and a signal is therefore given.

(5) As the cam 12 permits the capsule 9 to return to its original condition sufficient time must be allowed for air to enter chamber 16 and body 3 to restore both chambers to atmospheric pressure before the body moves away from the cigarette, otherwise release of cigarette pressure on the plunger will permit it to protrude farther from the body and cause the pressure inside the body to drop and give rise to a signal.

The ports 7 and 8 and the passages connecting them are as large as possible so that the body is adequately connected to the atmosphere when the plunger is in the appropriate position. The hole 6 provides a kind of relief valve by permitting air to escape from the interior of the body 3 as the plunger is pushed in quickly by engaging a satisfactory cigarette. It is true that a slight clearance between the plunger and the hole in body 3 has been mentioned but this is very small and need not be present as the plunger might only be a sliding fit in the hole in the body. However, a slight clearance is desirable, not only for freedom of movement for the plunger but because air escaping around the plunger stem helps to keep dust out of the interior of the body. Also, of course, it assists in the restoration of the air circuits to atmospheric pressure after a detecting operation has been performed.

Since the apparatus works as a miniature pump it is necessary to supply air to the capsule and this is arranged for by a non-return valve 30, a flap valve being suitable.

The apparatus shown has no contacts or at least none exposed to dust and as it is operated by pulses of pressure air any dust which might conceivably get into 3 or 16 will be blown out. Instead of the capacity transducer 19, a rather similarly constructed device in which diaphragm movements open and close a contact could be used, in which case the device 25 can be eliminated or simplified. Such a device is shown in FIGURE 5 where the diaphragm closes a switch contact 36.

The arrangement shown is a convenient one for a single machine such as a cigarette packing machine but where numbers of such machines are in a workroom it is simply to provide a continuous supply of pressure air. Such supplies are common in many factories, such as engineering workshops.

In such a case there is no need for the capsule and the chamber 16 and the corresponding half of the pipe system. All that is necessary is to bias the diaphragm so that it only causes a signal when the pressure in body 3 drops as the result of a detecting operation and to provide means such as a mechanically or electrically controlled timing switch to mute the detector except at the proper times.

What I claim as my invention and desire to secure by Letters Patent is:

A cigarette detector for use in an automatic cigarette packing machine comprising a feeler chamber having an aperture in a wall thereof, a feeler resiliently slidable in said aperture, the feeler having a hollow interior and a port leading therefrom to the interior of the feeler chamber and a further port leading from said hollow interior and positioned to be closed by the wall of said aperture or open to atmosphere according to the position assumed by said feeler in a detecting operation, a further chamber constituting a balancing chamber, means for simultaneously causing pulses of pressure air in both chambers, means operating in timed relationship with the first-mentioned means to move the feeler chamber toward the support and engage the feeler with a cigarette at the same time as the pressure pulses occur in the chambers, an electrical condenser having two compartments, a diaphragm between said compartments constituting a condenser plate and a fixed condenser plate adjacent the first-mentioned condenser plate, a pipe leading from the feeler chamber to one of said compartments of the condenser, a second pipe leading from the other chamber to the other compartment of the condenser so that the pressures in the compartments are equal while the further port is closed, the feeler positions which expose the further port to atmosphere cause reduced pressure in the feeler chamber and in the condenser compartment to which said chamber is connected by the first-mentioned pipe, and the consequent diaphragm movement changes the capacity of the condenser; a transistorized capacity change detector connected to the condenser to cause a signal to be indicated when the condenser capacity changes, the means for simultaneously causing pulses of pressure air consisting of an air capsule and cam mechanism for periodically pressing the capsule to provide a pulse, and cam mechanism coupled to the first-mentioned cam mechanism to move the feeler chamber to engage the feeler with a cigarette as a pressure pulse is generated.

References Cited in the file of this patent

UNITED STATES PATENTS

| | | |
|---|---|---|
| 1,986,479 | Lowe | Jan. 7, 1935 |
| 2,008,870 | Little | July 23, 1935 |
| 2,493,351 | Jones | Jan. 3, 1950 |
| 2,836,296 | Lewis | May 27, 1958 |
| 2,898,683 | Kiefaber | Aug. 11, 1959 |

FOREIGN PATENTS

| | | |
|---|---|---|
| 883,333 | France | July 1, 1943 |
| 917,899 | France | Jan. 23, 1947 |